US006442393B1

(12) United States Patent
Hogan

(10) Patent No.: US 6,442,393 B1
(45) Date of Patent: Aug. 27, 2002

(54) USE OF MOBILE LOCATING AND POWER CONTROL FOR RADIO NETWORK OPTIMIZATION

(75) Inventor: Billy Hogan, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/186,624

(22) Filed: Nov. 6, 1998

(51) Int. Cl.⁷ .................................................. H04Q 7/20
(52) U.S. Cl. ...................... 455/456; 455/67.3; 455/522; 455/67.1
(58) Field of Search ................................ 455/456, 12.1, 455/33.1, 435, 432, 524, 421, 429, 427, 405, 411, 69, 522, 67.1, 67.3, 63, 457, 425, 410; 370/329, 312, 252; 379/32

(56) References Cited

U.S. PATENT DOCUMENTS

| | | | | |
|---|---|---|---|---|
| 5,095,500 A | * | 3/1992 | Tayloe | 379/32 |
| 5,235,633 A | * | 8/1993 | Dennison | 455/456 |
| 5,487,174 A | * | 1/1996 | Persson | 455/444 |
| 5,490,288 A | * | 2/1996 | Wiatrowski | 455/517 |
| 5,530,912 A | | 6/1996 | Agrawal et al. | |
| 5,551,058 A | | 8/1996 | Hutcheson et al. | |
| 5,561,839 A | | 10/1996 | Österberg et al. | |
| 5,640,676 A | | 6/1997 | Garncarz et al. | |
| 5,758,264 A | * | 5/1998 | Bonta | 455/67.7 |
| 5,857,155 A | * | 1/1999 | Hill | 455/456 |
| 5,881,368 A | * | 3/1999 | Grob | 455/69 |
| 5,943,014 A | * | 8/1999 | Gilhousen | 342/465 |
| 6,006,089 A | * | 12/1999 | Sasaki | 455/423 |
| 6,072,778 A | * | 6/2000 | Labedz | 370/252 |
| 6,078,568 A | * | 6/2000 | Wright | 370/312 |
| 6,163,698 A | * | 12/2000 | Leitch | 455/450 |

FOREIGN PATENT DOCUMENTS

| | | |
|---|---|---|
| EP | 0 431 956 A | 6/1991 |
| EP | 0 602 340 A1 | 6/1994 |
| EP | 0 800 319 A1 | 10/1997 |
| WO | WO 96/16524 | 5/1996 |
| WO | WO 98/19492 | 5/1998 |

OTHER PUBLICATIONS

J–O Lejoal, "Cello, A Powerful Operations Tool for Trouble– Shooting in Cellular Systems", 38th Vehicular Technology Conference: 'Telecommunications Freedom—Technology on the Move, 'Philadelphia, PA, USA, Jun. 15–17, 1988, pp. 656–658.
TEMS–A System for Testing and Monitoring Air Interfaces; Ericsson Review No. 1; Rikard Lundqvist; pp. 34–44; 1996.

* cited by examiner

Primary Examiner—Vivian Chin
Assistant Examiner—John J. Lee
(74) Attorney, Agent, or Firm—Burns, Doane, Swecker & Mathis, L.L.P.

(57) ABSTRACT

A method and system for automatically mapping areas of poor network coverage or high interference in a cellular network uses signal quality measures and mobile station location information. The system constructs a visual map that notes the locations of mobile stations when unacceptable base station-mobile station signal quality is reported. The visual map can be used for identifying areas of the network that may require remediation to ensure sufficient network coverage.

54 Claims, 3 Drawing Sheets

USE OF MOBILE LOCATING AND POWER CONTROL FOR RADIO NETWORK OPTIMIZATION

This application is related to U.S. patent application Ser. No. 09/186,623 entitled "Cell Hand-off Border Identification Using MS Positioning and Signal Strength Values," filed Nov. 6, 1998; U.S. Pat. No. 6,266,514, entitled "Poor Network Coverage Mapping," filed Nov. 6, 1998; and U.S. patent application Ser. No. 09/186,614, entitled "Use of Mobile Locating and Power Control for Radio Network Optimization," filed Nov. 6, 1998; the disclosures of which are expressly incorporated herein by reference.

BACKGROUND

The present invention is directed generally to radiocommunication systems and, more particularly, to techniques for identifying and mapping areas of poor signal quality in a CDMA radiocommunication system.

A mobile phone network conventionally consists of a plurality of base stations arranged in a pattern so as to define a plurality of overlapping cells which provide radiocommunication support in a geographic area. Base stations in the network are located so as to provide optimal coverage of the mobile phone service area. The transmission pattern of a geographic arrangement of network base stations typically looks like a honeycomb of cells. Each base station with omnidirectional transmission in the network serves a roughly circular area with a diameter ranging from a few hundred meters to several kilometers depending on population density. Additionally, base stations may have adaptive antennas that cover only narrow sectors, thus producing "sectored" cells instead of circular cells. The mobile phone network typically only has a specified number of frequencies available for use by mobile subscribers. Therefore, to maximize use of the specified number of frequencies while preventing interference between adjacent base stations, each base station supports different frequencies than its corresponding adjacent base stations. When a mobile subscriber moves to the edge of a cell associated with a current servicing base station the mobile subscriber can be "handed-off" to an adjacent base station so as to enable call quality and signal strength to be maintained at a predetermined level.

Traditionally, radio communication systems have employed either Frequency Division Multiple Access (FDMA) or Time Division Multiple Access (TDMA) to allocate access to available radio spectrum. Both methods attempt to ensure that no two potentially interfering signals occupy the same frequency at the same time. For example, FDMA assigns different signals to different frequencies. TDMA assigns different signals to different timeslots on the same frequencies. TDMA methods reduce adjacent channel interference through the use of synchronization circuitry which gates the reception of information to prescribed time intervals.

In contrast, Code Division Multiple Access (CDMA) systems allow interfering signals to share the same frequency at the same time. More specifically, CDMA systems "spread" signals across a common communication carrier by multiplying each signal with a unique spreading code sequence. The signals are then scrambled and transmitted on the common carrier in overlapping fashion as a composite signal. Each mobile receiver correlates the composite signal with a respective unique despreading code sequence, and thereby extracts the signal addressed to it.

The signals which are not addressed to a mobile receiver in CDMA assume the role of interference. To achieve reliable reception of a signal, the bit energy to interference ratio (Eb/Io) should be above a prescribed threshold for each mobile station. The bit energy of the signal is therefore adjusted to maintain the appropriate Eb/Io threshold level. However, increasing the energy associated with one mobile station increases the interference associated with other nearby mobile stations. As such, the radio communication system must strike a balance between the requirements of all mobile stations sharing the same common carrier. A steady state condition is reached when the Eb/Io requirements for all mobile stations within a given radio communication system are satisfied. Generally speaking, the balanced steady state may be achieved by transmitting to each mobile station using power levels which are neither too high nor too low. Transmitting messages at unnecessarily high levels raises interference experienced at each mobile receiver, and limits the number of signals which may be successfully communicated on the common radio frequency channel (e.g. reduces system capacity).

In a conventional CDMA system such as, for example, a CDMA system using the IS-95 standard, power control commands are transmitted from the base station to a mobile station so that a constant bit energy to interference ratio is maintained for each received signal at the base station. To accomplish this reverse link power control, the base station sends a power control bit 800 times a second over the forward fundamental channel to the mobile station. This power control bit informs the mobile station whether the mobile station should raise or lower its transmission power level so as to maintain a constant Eb/Io at the base station. A transmitted power control bit with a value of 0 indicates that the mobile station should raise power. A transmitted power control bit with a value of 1 indicates that the mobile station should lower power. In response to the transmitted power control bit, the mobile station adjusts the transmission power by 1 db increments on the reverse link. The base station then measures the Eb/Io ratio of the power adjusted reverse link signal and repeats the above process in an iterative fashion until the Eb/Io ratio reaches the specified level.

Measurement of the Eb/Io ratio provides an indication of either poor network coverage or high network interference conditions in a CDMA system. If poor network coverage exists at a given location of a mobile station then bit energy Eb will decrease (I will not change if the number of users remains the same) and thus the Eb/Io ratio will likely decrease. Furthermore, if high interference exists at a given location, the interference Io will increase and thus the Eb/Io ratio will likely decrease. An increase in the interference Io generally implies that the number of mobiles has increased, since Io is composed of the normalized interference from mobile stations in the same cell, the interference from mobile stations in adjacent cells, and the background noise. The component of the interference due to same cell mobile stations will generally predominate.

Poor network coverage can occur due to a number of conditions including poor network planning, localized terrain features, shadowing due to obstacles (e.g., buildings, trees) in the path of the mobile station-base station connection, and "holes" in network coverage due to the phenomenon of "cell breathing." "Cell breathing" occurs when a mobile on the edge of a cell transmits close to its maximum power to overcome interference from other mobiles in the cell and to communicate with the base station. When new mobiles enter the cell and are allocated a channel they will raise the overall interference level. Thus, the mobile station at the cell edge will have to raise its power further to maintain the required signal to interference ratio at the base station. However, due to maximum power limitations, the mobile station at the cell edge is unable to raise its power any further. Thus, mobiles in this situation are either handed off to another cell or another frequency or the call is dropped. The net effect of this process is that the cell border effectively shrinks. This cell shrinking due to high load can cause coverage holes between cells.

High interference conditions can occur when there are a large number of users in a cell in a CDMA network. These large number of users produce an unstable state where any single user must increase power to overcome interference from surrounding users. The increase in power of any single user causes an increase in the overall level of interference, which further causes other users to also raise their power. This process can result in a rapidly escalating state of congestion. High interference conditions can be managed by the network by balancing the requirements of all mobile stations sharing the same, common radio frequency channel, as already discussed above. However, high data rate services that require the transmission of bursty packets of data over the air can cause localized interference conditions that cannot be adequately managed by the network.

Often, as noted above, high interference or poor coverage conditions can persist in certain localities of a CDMA network in spite of the use of power control commands. These areas of persistent poor coverage or high interference can impair the quality of the mobile subscriber signal and also impair the ability of the network to avoid call dropping. In areas where poor coverage or high interference conditions exist, the quality of the phone signal will likely be degraded. Furthermore, in geographic areas of poor coverage or very high interference, the potential for call dropping exists.

Conventionally, network coverage and interference conditions are monitored through the performance of drive tests by network operator staff. To perform this monitoring, operator staff drive throughout the network and conduct and record call quality checks. This conventional monitoring technique, however, requires an inordinate amount of resources to survey the network. Such resources include extra monitoring equipment, extra staff to conduct the drive tests, and additional staff time to drive around and survey the network. Furthermore, the time delay between the actual time at which interference in a locality increases to a level that will have an adverse impact on call quality or system performance and the time taken to survey the network, tabulate the results, and implement changes in the network coverage, ensures a period of degraded performance to affected mobile subscribers.

Accordingly, it would be desirable to provide a technique for monitoring a cellular network that minimizes the time required to detect areas of poor network coverage or high interference and which further minimizes the necessity of operator intervention.

SUMMARY

These desirable characteristics and others are provided by the following exemplary embodiments of the invention.

According to one exemplary embodiment of the invention a method of constructing a data representation indicating a signal quality associated with a location of a mobile station in a radiocommunications network is provided. The method of this exemplary embodiment comprises the steps of: selectively adjusting uplink or downlink transmission power between said mobile station and said network using power control parameters; providing a location of said mobile station based on at least said power control parameters; selectively constructing a data representation indicating signal quality using said provided location and at least said power control parameters.

According to a second exemplary embodiment of the present invention a method of constructing a map of signal qualities associated with locations of mobile stations in a radiocommunications network is provided. The method of this exemplary embodiment comprises the steps of: a) selectively adjusting uplink or downlink transmission power between said mobile stations and said network using power control parameters; b) providing locations of each of said mobile stations based on at least said power control parameters; c) constructing data representations indicating said signal qualities using said provided locations of each of said mobile stations and at least said power control parameters; and d) selectively repeating steps a) through c) to construct a map of signal qualities throughout at least a portion of said network.

According to a third exemplary embodiment of the present invention a method of constructing a map of signal qualities associated with locations of mobile stations in a radiocommunications network is provided. The method of this exemplary embodiment comprises the steps of: a) providing at least one parameter indicative of a signal quality associated with a location of a mobile station, wherein said at least one parameter includes transmission power control parameters; b) comparing said at least one parameter with at least one criteria to provide a comparison result; c) initiating a positioning request from said network based on said comparison result; d) providing a location of said mobile station based on said positioning request; e) constructing a data representation indicating said signal quality using said at least one criteria and said location; and f) selectively repeating steps a) through e) to construct a map of signal qualities throughout at least a portion of said network.

BRIEF DESCRIPTION OF THE DRAWINGS

The objects and advantages of the invention will be understood by reading the following detailed description in conjunction with the drawings in which.

DETAILED DESCRIPTION

Figure 1:
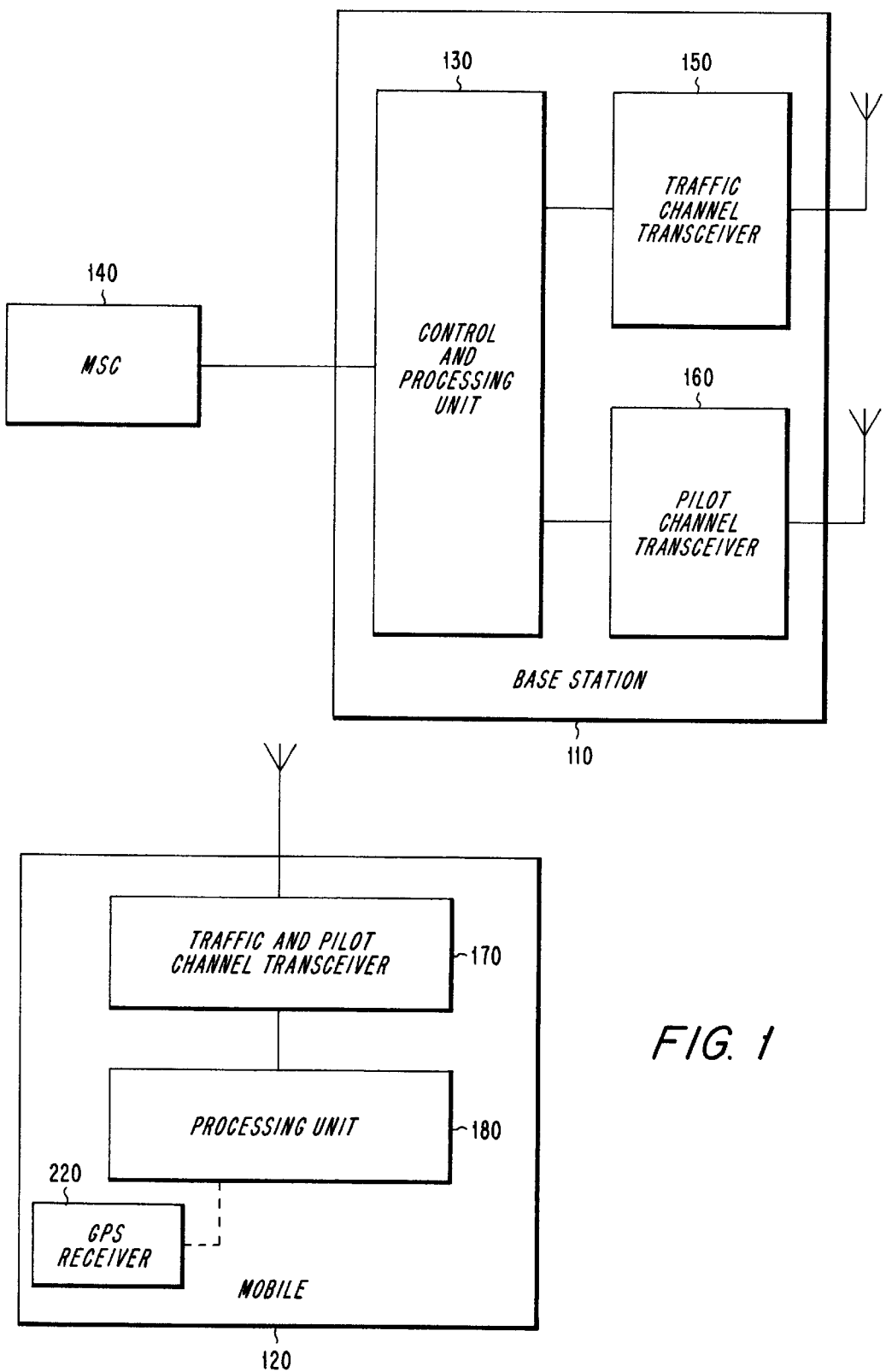
FIG. 1 represents an exemplary implementation of an apparatus for a cellular communications system according to the present invention.

To provide some context within which to describe the present invention consider FIG. 1, which represents a block diagram of an exemplary cellular mobile radiotelephone system, including an exemplary base station 110 and mobile station 120. The base station includes a control and processing unit 130 which is connected to the MSC 140 which in turn is connected to the PSTN (not shown). General aspects of the cellular radiotelephone system shown in FIG. 1 are known in the art.

The base station 110 handles a plurality of traffic channels through a traffic channel transceiver 150, which is controlled by the control and processing unit 130. Also, each base station includes a pilot channel transceiver 160 for broadcasting pilot signals to mobile stations 120 in the network.

The mobile station 120 scans for pilot channels from one or more base stations using its traffic and pilot channel transceiver 170. Then, the processing unit 180 evaluates the received pilot signals to determine which base station is a suitable candidate to serve the mobile station 120. When the processing unit 180 selects the base station associated with the preferred pilot channel, the mobile station 120 demodulates the transmitted paging channel from that base station and then receives system parameter information from that base station.

In accordance with an exemplary embodiment of the invention, shown in FIG. 1, mobile station position update information can be provided by the base station control and processing unit 130. This position update information can be calculated in any desired manner. For example, the position can be derived from a GPS receiver 220 located in the mobile station receiver 120. One skilled in the art will recognize, however, that various techniques for determining the location of a mobile station are known in the art, such as, for example, the technique disclosed in European Patent Application EP 0800319A1. If GPS is used to report the mobile station location, the mobile station can transmit position update information ("mobile position report") to the base station 110 in a regular periodic message that is either periodically transmitted or transmitted based on a positioning request from the network. In other positioning methods, however, the actual positioning determination is performed by the network and thus no position data needs to be transmitted over the air interface.

In exemplary embodiments of the invention, the position update information provided at the base station 110 is used in conjunction with the power control commands transmitted to the mobile station 120 to determine signal quality conditions. First, one or more interference determining algorithms are set in the operations and maintenance center (OMC) 1 shown in FIG. 2. As described below in more detail, different algorithms can be used to identify signal quality conditions on the network map. The parameters for the different algorithms are then sent via 2 to the prescribed base station controllers (BSC) 3 to be implemented within a supervisory functionality that is incorporated into each BSC. One skilled in the art will recognize, however, that the supervisory functionality could be incorporated into the processor of the mobile switching center (MSC) or a network node separate from either the BSC or the MSC.

Figure 2:
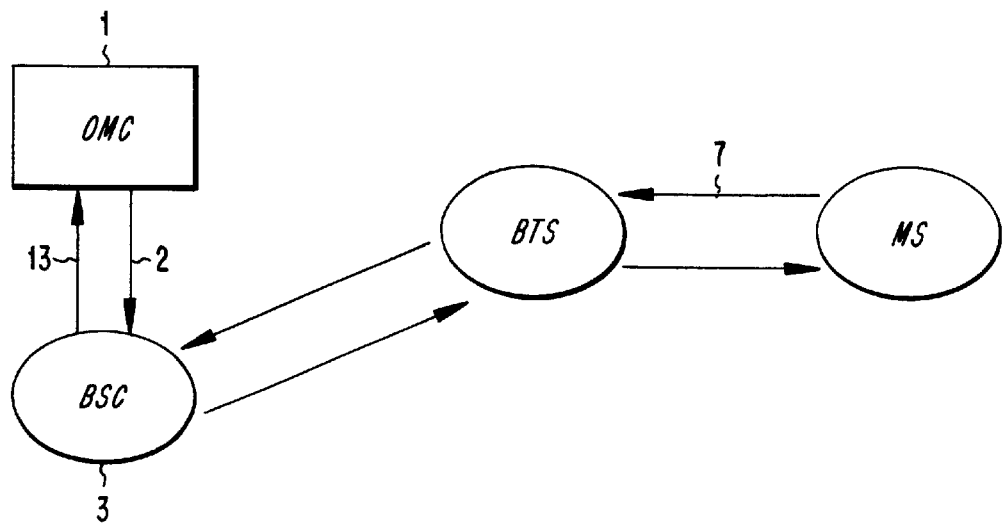
FIG. 2 shows a diagram of a cellular system operating in accordance with exemplary embodiments of the present invention.
Figure 3:
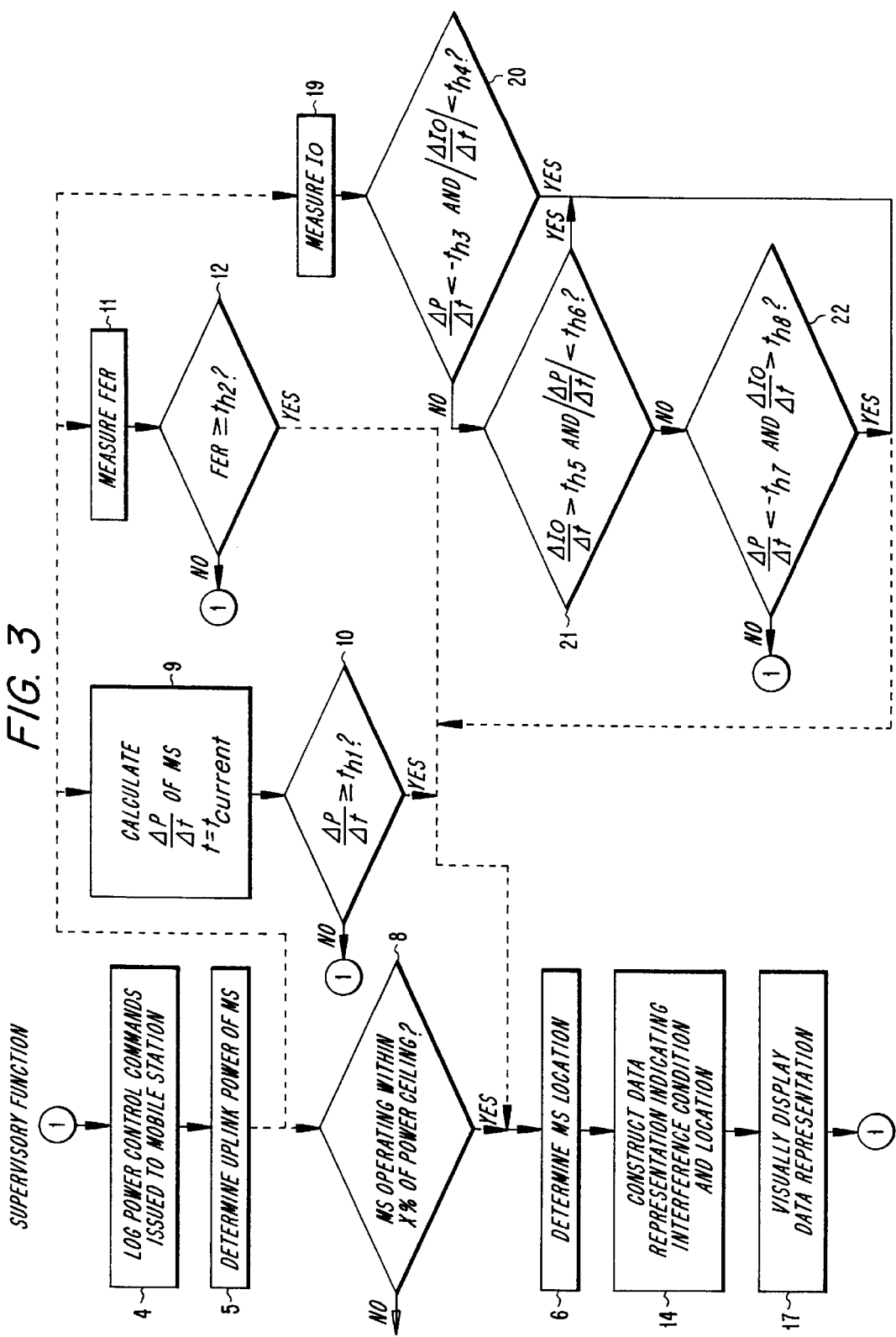
FIG. 3 shows a flow diagram of exemplary method steps of the present invention.

As illustrated in the flow diagram of FIG. 3, the BSC supervisory functionality (SF) first logs 4 the power control commands issued to mobile stations. Then, based on the power control commands or constant measurements of uplink power, the SF determines 5 the uplink power of the mobile stations. Subsequently, the SF determines signal quality conditions using a number of algorithms, as discussed further below, so as to invoke a positioning function that determines the mobile station's geographic position 6. The positioning function then requests the identity and location of the associated mobile station. In response to this request, the mobile station transmits location information (7, FIG. 2) to the BSC, in an exemplary embodiment wherein the mobile station includes a GPS receiver or some other locating mechanism. Alternatively, if the locating function 6 is performed by network components, then the positioning function requests the mobile station's current position from the system.

In the algorithm of one exemplary embodiment, an interference or poor coverage condition is identified by determining those mobile stations that are operating within a certain percentage of their transmission power ceilings 8. This could include operation at the mobile station's power ceiling. This operating status is indicative of an interference condition, a cell border, or a coverage hole, since the mobile station is likely to have been driven into a high power state due to the issuance of power control commands from the base station in attempts to overcome high interference conditions or poor coverage conditions.

In the algorithm of another exemplary embodiment, an interference or poor coverage condition is identified by analyzing the trend of the power transmission curve associated with each mobile station over time 9. When the slope of the power transmission curve is high, a large fluctuation in power is indicated which can correspond to increased interference. Therefore, the SF can calculate the slope of the power transmission curve over the current time interval and compare this to a specified threshold:

$$\left|\frac{\Delta P}{\Delta t}\right|(t = t_{current}) \geq t_{hl}$$

When the calculated slope of the power transmission curve exceeds the specified threshold value 10, the base station controller invokes the positioning function 6 to determine the mobile station's geographic position.

In the algorithm of an additional exemplary embodiment, the SF logs the signal interference level, measured at the base station, to produce an interference curve that permits discrimination between different signal quality conditions when the interference curve is compared with the power control curve. Using the slope of the logged interference curve and the slope of the power control curve, the SF can distinguish between low network coverage or high interference conditions. Under poor/low network coverage conditions the slope of the power control curve will increase and the slope of the interference curve will maintain a substantially constant level (equivalent to Eb↓/Io→=Eb/Io↓). Under high interference conditions the slope of the interference curve will increase while the slope of the power control curve will maintain a substantially constant level (equivalent to Eb→/Io↑=Eb/Io↓). Under indeterminate poor signal quality conditions, the slope of the power control curve will decrease simultaneously with an in the slope of the interference curve (equivalent to Eb↓/Io↑=Eb/Io↓).

In the algorithm of this exemplary embodiment, the SF distinguishes between poor coverage and high interference conditions by calculating the slope of the power control curve ($\Delta P/\Delta t$) and the slope of the interference curve ($\Delta Io/\Delta t$). These calculated slopes are then compared with a number of defined threshold values as shown in FIG. 3. If the slope of the power control curve is decreasing at a rate greater than a defined threshold ($\Delta P/\Delta t < -t_{h3}$) and the slope of the interference curve is maintaining a substantially constant level ($|\Delta Io/\Delta t| < t_{h4}$) 20, then a low or poor coverage condition is indicated at the position of the mobile station. If the slope of the power control curve is maintaining a substantially constant level ($|\Delta P/\Delta t| < t_{h6}$), but the slope of the interference curve is increasing at a rate greater than a defined threshold ($\Delta Io/\Delta t > t_{h5}$) 21, then a high interference condition is indicated at the position of the mobile station. Also, if the slope of the power control curve decreases at a rate greater than a defined threshold ($\Delta P/\Delta t < -t_7$) and the slope of the interference curve increases at a rate greater than a defined threshold ($\Delta Io/\Delta t > t_{h8}$) 22, then a poor signal quality condition of indeterminate cause exists. This indeterminate condition may either indicate low/poor network coverage or high interference. When poor coverage, high interference, or indeterminate poor signal quality conditions are indicated by the algorithm of this exemplary embodiment, the base station controller invokes the positioning function 6 to determine the mobile station's geographic location.

It is noted that the numerous comparisons of the interference curve slope ($\Delta Io/\Delta t$) with corresponding threshold values, discussed above and shown in FIG. 3 at steps 20, 21, and 22, could each be replaced with, or used in combination with, an additional comparison between the interference level (Io) and corresponding thresholds. For example, the criterion $\Delta Io/\Delta t > t_{h5}$, shown in step 21 of FIG. 3, could be replaced with an interference-to-threshold comparison $Io > t_{h9}$. $Io > t_{h9}$ could also be used as an additional criterion in combination with $\Delta Io/\Delta t > t_{h5}$. Use of an interference level criterion would thus provide an additional indicator of high interference in steps 20, 21, and 22 shown in FIG. 3.

In an algorithm of a further exemplary embodiment, the SF analyzes the frame error rate of the uplink signal from the mobile station 11. In IS-95, for example, reverse link frames are sent every 20 ms over the reverse fundamental channel. If the measured FER of these frames exceeds a specified threshold (FER>$t_{h2}$) 12 for a particular period of time, the SF will invoke the location function 6.

The different algorithms for determining signal quality conditions, discussed above, can be combined for use in an additional embodiment. This additional embodiment can make use of two or more of the signal quality measures shown in FIG. 3 (8, 9, 11, 20, 21, or 22) to determine an overall signal quality value. For example, the positioning function could be invoked when the mobile station is transmitting within X % of its power ceiling and when the slope of the power transmission curve for that mobile is greater than a specified threshold. As an additional example, the positioning function could be invoked when the mobile station is transmitting within X % of its power ceiling and when the reverse link FER exceeds a specified threshold. One skilled in the art will recognize that any number of interference measures could be combined in one or more algorithms to determine the existence of poor signal quality conditions and, subsequently, determining the geographic position of the mobile station experiencing the poor signal quality condition.

Figure 4:
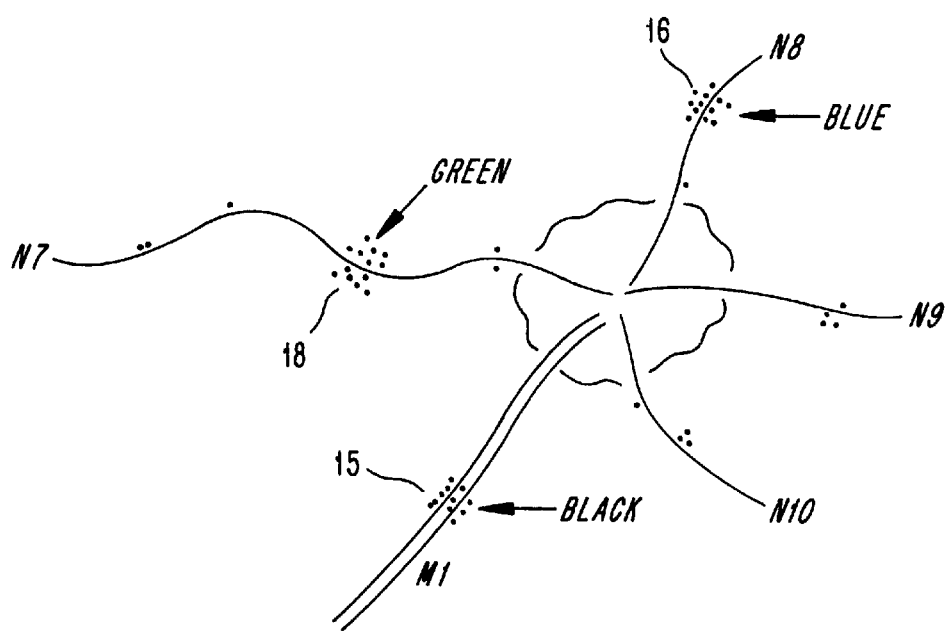
FIG. 4 shows a network map indicating areas of deficient signal quality according to exemplary embodiments of the invention.

After the positioning function determines the mobile station location, the BSC (3, FIG. 2) compiles the mobile station identification, signal quality measures, cell identification, and mobile station location information and transmits the information to the OMC (13, FIG. 2). A processor at the OMC operates upon the received data to construct a data representation 14 that indicates the signal quality measure and the associated mobile station location. This data representation can include translations of the different signal quality measures into different colored visual representations 17. For example, a FER greater than a first threshold could be represented as a green pixel or dot. Additionally, a FER greater than a second, higher threshold could be represented as a blue pixel or dot to indicate greater signal degradation. Over a period of time, a series of dots will accumulate in an area that is inadequately covered by the network. As the geographic illustration in FIG. 4 shows, an accumulation of green dots 18 or blue dots 16 will clearly indicate areas of low or high signal quality. This application of color coding to provide a visual representation of signal quality could analogously be applied to any of the signal quality measures discussed above. Furthermore, the technique of color coding could be used to show the interference conditions encountered by the mobile station as the mobile station traverses the network map. Thus, using this technique, only one pixel would be associated with a given mobile station and the pixel would move on the visual representation of the network map as the mobile station moves, and may or may not change color, depending on the signal quality affecting conditions that are encountered.

The above exemplary embodiments all involve the reverse link from the mobile station to the base station. However, one skilled in the art will recognize that information on the forward link power control can also be used in a similar fashion to enable the mobile stations to raise or lower the power of the serving base station. This forward link power control is achieved by the mobile station informing the base station to adjust its power to maintain a specified FER on the forward channel received at the mobile station. Conventionally, this is accomplished using layer 3 commands that are not transmitted as often as specific power control commands (at present layer 3 power control messages are sent approximately a maximum of four times a second). Forward link power control using error indicator bits in the reverse link sent once every 20 ms frame, has a maximum rate of 50 Hz. However, in third generation systems, such as WCDMA or CDMA2000, fast power control on the forward link is anticipated.

Exemplary embodiments of the invention thus provide desirable techniques for automatically mapping areas of poor signal quality in a cellular network. Using mobile station positioning information, a visual map can be constructed for viewing in the operations and maintenance center that permits real time identification of areas of poor signal quality in the network that may require remediation. These techniques are advantageous in that they require minimal loading on current systems (i.e., provision of mobile station location data) and permit a reduction in resources and man-hours that were previously required to manually survey the network.

Although a number of embodiments are described herein for purposes of illustration, these embodiments are not meant to be limiting. Those skilled in the art will recognize modifications that can be made in the illustrated embodiment. Such modifications are meant to be covered by the spirit and scope of the appended claims.

What is claimed is:

1. A method of constructing a data representation indicating a signal quality associated with a location of a mobile station in a radiocommunications network, comprising the steps of:

selectively adjusting uplink or downlink transmission power between said mobile station and said network using power control parameters;

providing a location of said mobile station based on at least one or more specified trends in said power control parameters; and selectively constructing a data representation indicating said signal quality using said provided location and at least said power control parameters.

2. The method of claim 1, wherein said data representation is coded with a value derived from at least said power control parameters.

3. The method of claim 2, wherein said coded value represents color.

4. The method of claim 1, wherein said provision of the location of said mobile station is based additionally on when said power control parameters indicate that said mobile station is transmitting within a percentage of a maximum power of said mobile station.

5. The method of claim 1, wherein said provision of the location of said mobile station is based additionally on when said power control parameters indicate that said network is transmitting within a percentage of a specified maximum power.

6. The method of claim 1, wherein said location of said mobile station is provided based additionally on a forward link frame error rate associated with said mobile station.

7. The method of claim 1, wherein said location of said mobile station is provided additionally based on a reverse link frame error rate associated with said mobile station.

8. The method of claim 1, wherein said signal quality indicates poor network coverage.

9. The method of claim 1, wherein said signal quality indicates high signal interference.

10. The method of claim 1, wherein said mobile station location is additionally provided based on one or more trends in measured interference levels associated with said uplink or downlink.

11. A system for constructing a data representation indicating a signal quality associated with a location of a mobile station in a radiocommunications network comprising:
  means for selectively adjusting uplink or downlink transmission power between said mobile station and said network using power control parameters;
  means for providing a location of said mobile station based on at least one or more specified trends in said power control parameters; and
  means for selectively constructing a data representation indicating said signal quality using said provided location and at least said power control parameters.

12. The system of claim 11, wherein said data representation is coded with a value derived from at least said power control parameters.

13. The system of claim 12, wherein said coded value represents color.

14. The system of claim 11, wherein said provision of the location of said mobile station is provided additionally based on when said power control parameters indicate that said mobile station is transmitting within a percentage of a maximum power of said mobile station.

15. The system of claim 11, wherein said provision of the location of said mobile station is provided additionally based on when said power control parameters indicate that said network is transmitting within a percentage of a specified maximum power.

16. The system of claim 11, wherein said location of said mobile station is provided based additionally on a forward link frame error rate associated with said mobile station.

17. The system of claim 11, wherein said location of said mobile station is provided additionally based on a reverse link frame error rate associated with said mobile station.

18. The system of claim 11, wherein said signal quality indicates poor network coverage.

19. The system of claim 11, wherein said signal quality indicates high signal interference.

20. The system of claim 11, wherein said mobile station location is provided additionally based on one or more trends in measured interference levels associated with said uplink or downlink.

21. A method of constructing a map of signal qualities associated with locations of mobile stations in a radiocommunications network comprising the steps of:
  a) selectively adjusting uplink or downlink transmission power between said mobile stations and said network using power control parameters;
  b) providing locations of each of said mobile stations based on at least one or more specified trends in said power control parameters;
  c) constructing data representations indicating said signal qualities using said provided locations of each of said mobile stations and at least said power control parameters; and
  d) selectively repeating steps a) through c) to construct a map of signal qualities throughout at least a portion of said network.

22. A method of constructing a data representation indicating a signal quality associated with a location of a mobile station in a radiocommunications network, comprising the steps of:
  providing at least one parameter indicative of a signal quality associated with said location of said mobile station, wherein said at least one parameter includes transmission power control parameters;
  comparing said at least one parameter with at least one criteria to provide a comparison result;
  initiating a positioning request from said network based on said comparison result;
  providing a location of said mobile station based on said positioning request; and
  constructing a data representation indicating said signal quality using said at least one criteria and said location.

23. The method of claim 22, wherein said power control parameters control reverse link transmission power.

24. The method of claim 22, wherein said power control parameters control forward link transmission power.

25. The method of claim 22, wherein said comparison result indicates a trend of said power control parameters.

26. The method of claim 25, wherein said positioning request is initiated when said comparison result indicates one or more specified trends in said power control command parameters.

27. The method of claim 22, wherein said at least one parameter includes a forward link frame error rate.

28. The method of claim 22, wherein said at least one parameter includes a reverse link frame error rate.

29. The method of claim 22, wherein said comparison result indicates that said mobile station is transmitting within a percentage of a maximum power of said mobile station.

30. The method of claim 22, wherein said data representation is coded with a value derived from said comparison result.

31. The method of claim 30, wherein said coded value represents color.

32. The method of claim 22, wherein said signal quality indicates poor network coverage.

33. The method of claim 22, wherein said signal quality indicates high signal interference.

34. The method of claim 22, wherein said mobile station location is provided based on one or more specified trends in said power control parameters and one or more trends in measured interference levels associated with said uplink or downlink.

35. A method of constructing a map of signal qualities associated with locations of mobile stations in a radiocommunications network comprising the steps of:
  a) providing at least one parameter indicative of a signal quality associated with a location of a mobile station, wherein said at least one parameter includes transmission power control parameters;
  b) comparing said at least one parameter with at least one criteria to provide a comparison result;

c) initiating a positioning request from said network based on said comparison result;

d) providing a location of said mobile station based on said positioning request;

e) constructing a data representation indicating said signal quality using said at least one criteria and said location; and f) selectively repeating steps a) through e) to construct a map of signal qualities throughout at least a portion of said network.

36. A method of constructing a data representation indicating a signal quality associated with a location of a mobile station in a radiocommunications network, comprising the steps of:

selectively adjusting transmission power of said mobile station over time between said mobile station and a base station via a forward link; and monitoring said transmission power of said mobile station over time at said base station via a reverse link;

evaluating said power control parameters to determine signal quality conditions according to at least one evaluation algorithm;

providing a location of said mobile station based on evaluation result of said step of evaluating;

selectively constructing a data representation indicating said signal quality using said provided location and at least said power control parameters.

37. The method of claim 36, wherein said data representation is coded with a value derived from at least said power control parameters.

38. The method of claim 37, wherein said coded value represents color.

39. The method of claim 36, wherein the location of said mobile station is provided when said evaluation result indicates that said mobile station is transmitting within a percentage of a maximum power of said mobile station.

40. The method of claim 36, wherein the location of said mobile station is provided when said evaluation result indicates that said network is transmitting within a percentage of a specified maximum power.

41. The method of claim 36, wherein said mobile station location is provided when said evaluation result indicates one or more specified trends in said power control parameters.

42. The method of claim 36, wherein said location of said mobile station is provided when said evaluation result indicates that a forward link frame error rate associated with said mobile station is greater than a specified threshold.

43. The method of claim 36, wherein said location of said mobile station is provided when said evaluation result indicates a reverse link frame error rate associated with said mobile station is greater than a specified threshold.

44. The method of claim 36, wherein said mobile station location is provided when said evaluation result indicates one or more specified trends in said power control parameters and one or more trends in measured interference levels associated with said uplink or downlink.

45. A system for constructing a data representation indicating a signal quality associated with a location of a mobile station in a radiocommunications network comprising:

a routine which selectively adjusts uplink or downlink transmission power between said mobile station and said network using power control parameters;

a routine for evaluating said power control parameters to determine signal quality conditions according to at least one evaluation algorithm;

a routine which determines at least one specified trend of said power control parameters based on evaluation result of said routine for evaluating said power control parameters;

a routine which provides a location of said mobile station based on at least one of said specified trends of said power control parameters; and a routine which selectively constructs a data representation indicating said signal quality using said provided location and at least said power control parameters.

46. The system of claim 45, wherein said data representation is coded with a value derived from at least said power control parameters.

47. The system of claim 46, wherein said coded value represents color.

48. The system of claim 45, wherein said location of said mobile station is additionally provided based on when said power control parameters indicate that said mobile station is transmitting within a percentage of a maximum power of said mobile station.

49. The system of claim 45, wherein said location of said mobile station is additionally provided based on when said power control parameters indicate that said network is transmitting within a percentage of a specified maximum power.

50. The system of claim 45, wherein said location of said mobile station is provided based additionally on a forward link frame error rate associated with said mobile station.

51. The system of claim 45, wherein said location of said mobile station is provided additionally based on a reverse link frame error rate associated with said mobile station.

52. The system of claim 45, wherein said signal quality indicates poor network coverage.

53. The system of claim 45, wherein said signal quality indicates high signal interference.

54. The system of claim 45, wherein said mobile station location is additionally provided based on one or more trends in measured interference levels associated with said uplink or downlink.

* * * * *